United States Patent
Ha et al.

(10) Patent No.: US 10,578,318 B2
(45) Date of Patent: Mar. 3, 2020

(54) SINGLE THERMOSTAT WITH MULTIPLE THERMOSTATIC RADIATOR VALVE CONTROLLERS

(71) Applicant: Computime, Ltd., Wanchai (HK)

(72) Inventors: Wai-Leung Ha, Hong Kong (HK);
Philip John Smith, Guangdong (CN);
Hong Bin Liao, Shenzhen (CN)

(73) Assignee: Computime Ltd., New Territories (HK)

(*) Notice: Subject to any disclaimer, the term of this patent is extended or adjusted under 35 U.S.C. 154(b) by 651 days.

(21) Appl. No.: 15/254,042

(22) Filed: Sep. 1, 2016

(65) Prior Publication Data
US 2018/0058705 A1    Mar. 1, 2018

(51) Int. Cl.
| | |
|---|---|
| *F24D 19/10* | (2006.01) |
| *F24D 19/00* | (2006.01) |
| *F16K 37/00* | (2006.01) |
| *F16K 31/04* | (2006.01) |
| *G05D 23/19* | (2006.01) |

(52) U.S. Cl.
CPC .......... *F24D 19/1018* (2013.01); *F16K 31/04* (2013.01); *F16K 37/0083* (2013.01); *F24D 19/0056* (2013.01); *F24D 19/0075* (2013.01); *G05D 23/1905* (2013.01)

(58) Field of Classification Search
CPC ............ F24D 19/1018; F16K 37/0083; G05D 23/1905; G05D 7/06232
See application file for complete search history.

(56) References Cited

U.S. PATENT DOCUMENTS

| | | | | |
|---|---|---|---|---|
| 2,210,122 A | * | 8/1940 | Midyette, Jr. ....... | F24D 19/1003 236/78 A |
| 3,132,659 A | * | 5/1964 | Kenyon ................. | B64D 37/20 137/39 |

(Continued)

FOREIGN PATENT DOCUMENTS

| | | | |
|---|---|---|---|
| EP | 2886916 A1 | 6/2015 | |
| GB | 2276941 A | * 10/1994 | ........... G05D 23/023 |

(Continued)

OTHER PUBLICATIONS

May 23, 2017—(WO) International Search Report—PCT/US2017/015353.
Mar. 5, 2019—(WO) International Preliminary Report on Patentability—PCT/US2017/015353.

*Primary Examiner* — Grant Moubry
*Assistant Examiner* — Phillip Decker
(74) *Attorney, Agent, or Firm* — Banner & Witcoff, Ltd.

(57) ABSTRACT

A heating system includes a single thermostat that controls multiple thermostatic radiator valve (TRV) controllers that control heat transfer to radiators in a room. Each TRV controller has the capability to automatically detect the open/closing point and maximum heating point and to register corresponding pin positions of the valve. Each TRV controller is subsequently instructed by the thermostat to adjust the valve in relation to a determined percentage of the registered pin positions, thus accounting for the varying characteristics among the valves in the system. The TRV controller detects the maximum heating point by checking the rate of temperature rising and the open/closing point by sensing the temperature turning point through a temperature sensor situated appropriately in relation to the associated radiator.

17 Claims, 5 Drawing Sheets

(56) References Cited

U.S. PATENT DOCUMENTS

| | | | | |
|---|---|---|---|---|
| 4,279,381 A * | 7/1981 | Yueh | F24D 19/1015 165/205 |
| 4,702,412 A * | 10/1987 | Zelczer | A62C 3/00 137/624.12 |
| 5,119,988 A * | 6/1992 | Fiedrich | G05D 23/126 237/59 |
| 5,178,324 A * | 1/1993 | Moesby | F24D 10/006 237/8 R |
| 5,732,666 A * | 3/1998 | Lee | B60K 11/085 123/41.05 |
| 6,394,361 B1 * | 5/2002 | Fridmann | F24D 19/1015 236/100 |
| 8,109,289 B2 * | 2/2012 | Trnka | F24D 19/1015 137/487 |
| 8,410,944 B2 * | 4/2013 | Hung | G01F 23/247 340/584 |
| 9,423,036 B1 * | 8/2016 | Garm | F16K 1/52 |
| 9,822,904 B2 * | 11/2017 | Thybo | F16K 31/04 |
| 2010/0045470 A1 * | 2/2010 | Araiza | F24D 1/00 340/603 |
| 2010/0049480 A1 * | 2/2010 | Pekar | F24D 19/1015 703/2 |
| 2013/0056543 A1 * | 3/2013 | Olivotti | G05D 23/1934 237/8 B |
| 2013/0308674 A1 * | 11/2013 | Kramer | G01K 15/005 374/1 |
| 2015/0316935 A1 * | 11/2015 | Schmidlin | F24D 19/1015 700/282 |
| 2016/0291608 A1 * | 10/2016 | Reider | G05B 15/02 |
| 2017/0336088 A1 * | 11/2017 | Hynes | F24F 11/30 |
| 2018/0031251 A1 * | 2/2018 | Smith | F24D 3/02 |
| 2018/0180301 A1 * | 6/2018 | Gabriel | G05D 23/1932 |
| 2018/0180302 A1 * | 6/2018 | Gabriel | F24D 19/1018 |
| 2018/0259198 A1 * | 9/2018 | Kent | F24D 19/1018 |
| 2018/0335791 A1 * | 11/2018 | Gustafsson | F24D 19/1018 |

FOREIGN PATENT DOCUMENTS

| | | | | |
|---|---|---|---|---|
| GB | 2461857 A * | 1/2010 | | F24D 19/0012 |
| GB | 2464095 A * | 4/2010 | | |
| JP | 03251629 A * | 11/1991 | | |
| WO | 2012002875 A1 | 1/2012 | | |

* cited by examiner

SINGLE THERMOSTAT WITH MULTIPLE THERMOSTATIC RADIATOR VALVE CONTROLLERS

BACKGROUND

A thermostatic radiator valve (TRV) controller typically operates in a standalone manner by measuring the surrounding temperature close to the associated radiator and regulates the temperature by adjusting the valve opening. However, the temperature close to the radiator is usually hotter than the actual room temperature. With the current RF technology, the TRV controller can work with a remote thermostat to regulate the room temperature based on the temperature measured with a thermostat mounted on the wall.

However, for larger rooms, there is usually more than one radiator, requiring multiple TRV controllers to control the room. Even with current RF technology, each TRV controller often requires an associated thermostat to operate properly, thus increasing the cost and also complicated the setup of the system.

Consequently, there is a need for a single thermostat in a room to control multiple TRV controllers in the market. However, with the typical tolerance of the valve's pin length, rubber hardness, and mechanical structure, it is very difficult to adjust the correct opening point for the valve through a TRV controller to have synchronized control of the system when multiple TRV controllers are used in one room.

SUMMARY

With an aspect, a heating system includes a single thermostat that controls multiple thermostatic radiator valve controllers that control heat transfer to radiators in a room. The thermostat includes a microcontroller, radio frequency (RF) module or integrated RF circuitry, temperature sensor to sense the room temperature. Each thermostatic radiator valve controller includes a microcontroller, RF module or integrated RF circuitry, and temperature sensor to sense the temperature around radiator and is controlled by the thermostat through a wireless channel.

With another aspect of the invention, the thermostat senses the room temperature and sends room temperature, set point temperature, and/or differential of set point temperature and room temperature to thermostatic radiator valve (TRV) controllers.

With another aspect of the invention, the thermostat senses the room temperature and sends a determined valve pin position percentage to the TRV controllers.

With another aspect of the invention, the TRV controller has the ability to automatically detect the open/closing point of the valve of a radiator by sensing the temperature turning point and register the position as the open/closing point. All further determined pin positions refer to this open/closing point as the start point of calculation.

With another aspect of the invention, the automatic detection of open/closing point is performed soon after installation or initiated by an RF command or by an entered command through a keypad in which a sequence of keys represents the entered command entered through a user interface.

With another aspect of the invention, if auto detection fails during summer operation, the TRV controller automatically detects winter operation by checking a signature indicative of a call for heat in order to initiate the auto detection again.

With another aspect of the invention, the TRV controller detects the maximum power output point by checking the rate of temperature rising of the radiator. By acquiring the pin position for maximum heat transfer from the radiator, the TRV controller registers the point as the 100% opening for all subsequent calculations rather than using the fully pin open position.

BRIEF DESCRIPTION OF THE DRAWINGS

The foregoing summary of the invention, as well as the following detailed description of exemplary embodiments of the invention, is better understood when read in conjunction with the accompanying drawings, which are included by way of example, and not by way of limitation with regard to the claimed invention.

DETAILED DESCRIPTION

When heating a larger room, there is usually more than one radiator requiring multiple controllers to control the heating of the room. With traditional systems, each controller often requires an associated thermostat thus increasing the cost and also complicating system setup.

Figure 1:
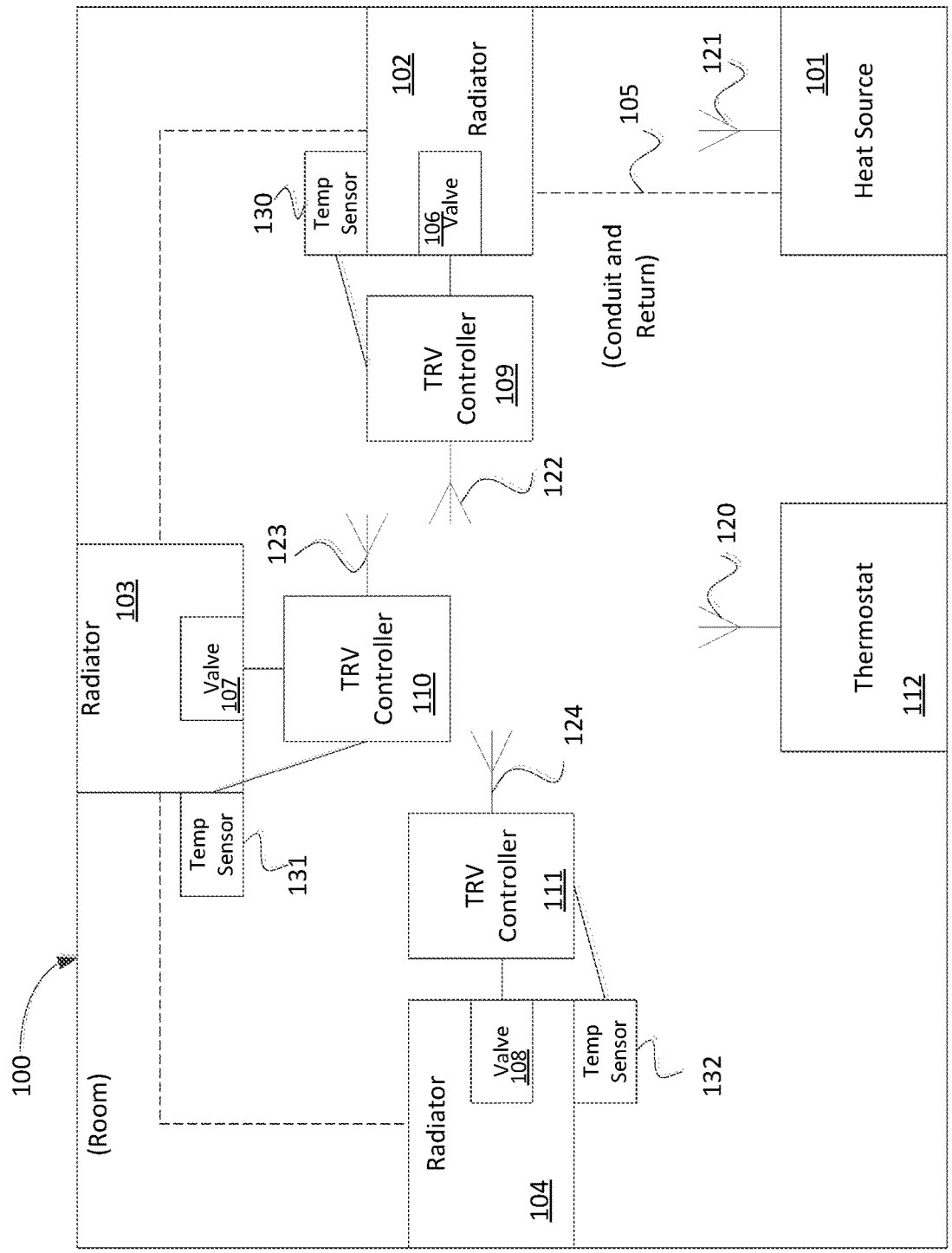
FIG. 1 shows a heating system for heating a room with multiple thermostatic radiator valve (TRV) controllers and a single thermostat in accordance with an embodiment of the invention.

FIG. 1 shows a heating system for heating room 100 with multiple thermostatic radiator valve (TRV) controllers 109-111 and single thermostat 112 in accordance with an embodiment of the invention. Each TRV controller 109-111 controls a corresponding valve 106-108, which in turn controls the heat transfer through heat conduit 105 (e.g., heated water pipe from heat source 101) to radiators 102-104, respectively.

Different components (e.g., single thermostat 112, TRV controllers 109-111, and heat source 101) may communicate with each other through wireless communication channels via antennas 120-124 or through wired connections. Wireless communications may utilize different frequency spectra, including radio frequency (RF), light, and infrared.

With traditional heating systems, it is typically difficult to adjust the correct opening point of the valve in order to have synchronized control of the system with multiple valve controllers in one room.

TRV controller 109-111 uses an internal temperature sensor 130-132 to detect the opening point (minimum opening position where the valve begins to open from the closed position) so that all TRV controller 109-111 of room 100 can be operated with the correct opening point when instructed by single thermostat 112. Temperature sensor 130-132 is situated in close proximity of associated radiator 102-104 to properly measure the radiator's temperature. The temperature sensor 130-132 may be housed within the TRV controller 109-111 which is close to the radiator 102-104 or connected via wires to the radiator itself 102-104.

TRV controller 109-111 also detects the maximum power output point by checking the rate of temperature rising of the radiator as measured through temperature sensors 130-132. By acquiring the maximum power pin position, the TRV controller 109-111 registers the pin position as 100% opening for all subsequent calculations rather than using the fully pin open position.

Each TRV controller 109-111 adjusts heat transfer to associated radiator 102-104 by controlling the pin position of valve 106-108. The amount of the pin movement determines how much the corresponding valve 106-108 is open and consequently the amount of heat transfer from heat conduit 105 to radiator 102-104. However, with the tolerance of the valve pin length and rubber hardness and mechanical structure of the valve, each TRV controller 109-111 calibrates operation to the actual dimensions of valve 106-108. As will be discussed, TRV controller 109-111 detects the minimum opening position and maximum opening position of the valve pin.

During normal operation (as will discussed with FIG. 3), single thermostat 112 senses room temperature and sends a calculated pin position percentage to TRV controller 109-111, where the percentage is in relation to the open/closed position (0 percentage) to the maximum opening position (100 percentage). Because of characteristic differences among valves 106-108, the associated minimum opening and maximum opening position vary among valves 106-108. However, by providing the calculated pin position percentage by thermostat 112, operation is normalized among TRV controllers 109-111. With an embodiment, the pin percentage sent by the single thermostat 112 does not vary as the TRV controllers 109-111 all receive the same pin percentage.

While FIG. 1 shows a system for heating room 100, some embodiments may be directed to cooling room 100 by cold water rather than hot water being transported by conduit 105.

Figure 2:
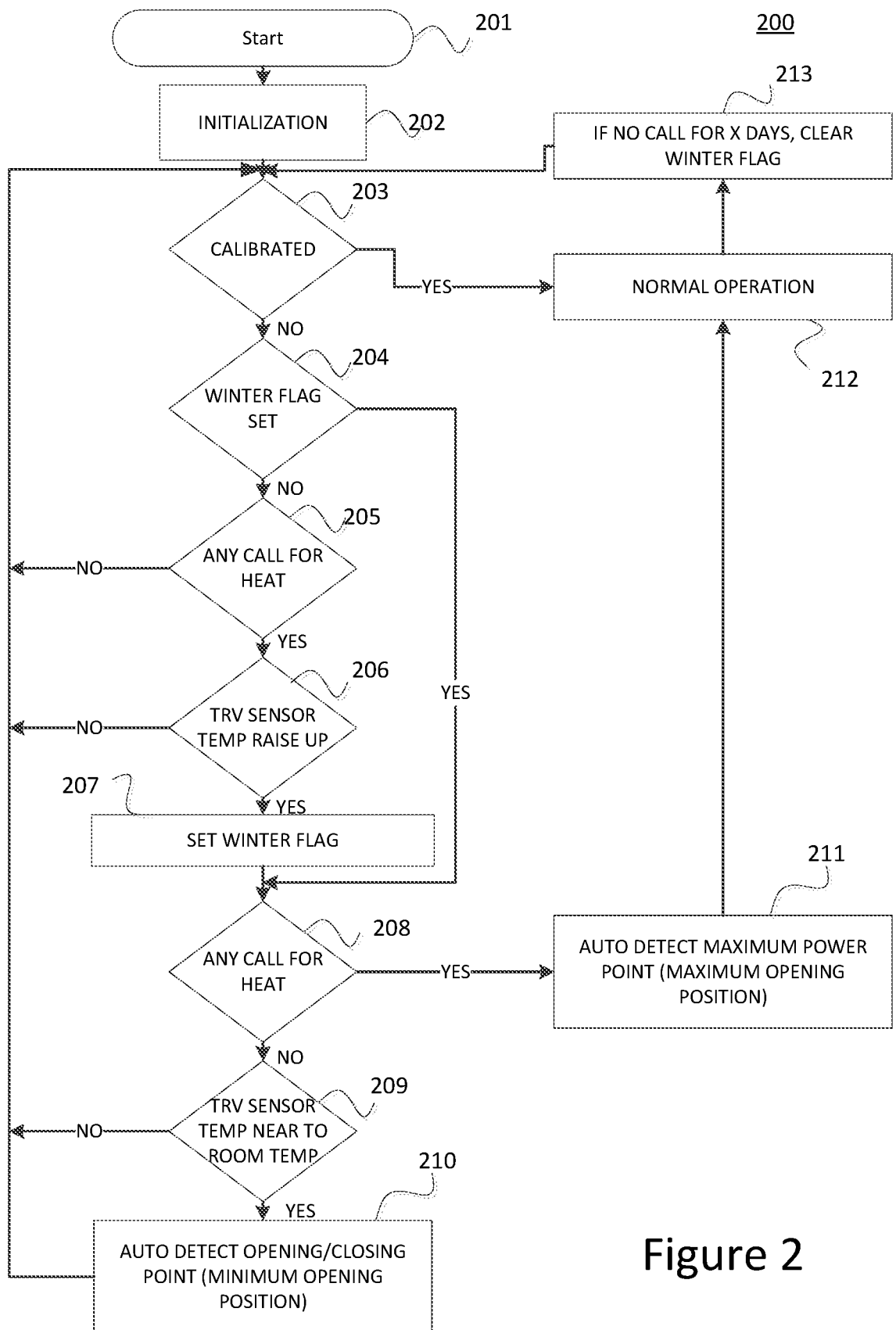
FIG. 2 shows a flowchart for controlling a heating system with a single thermostat and at least one thermostatic radiator valve (TRV) controller in accordance with an embodiment of the invention.
Figure 5:
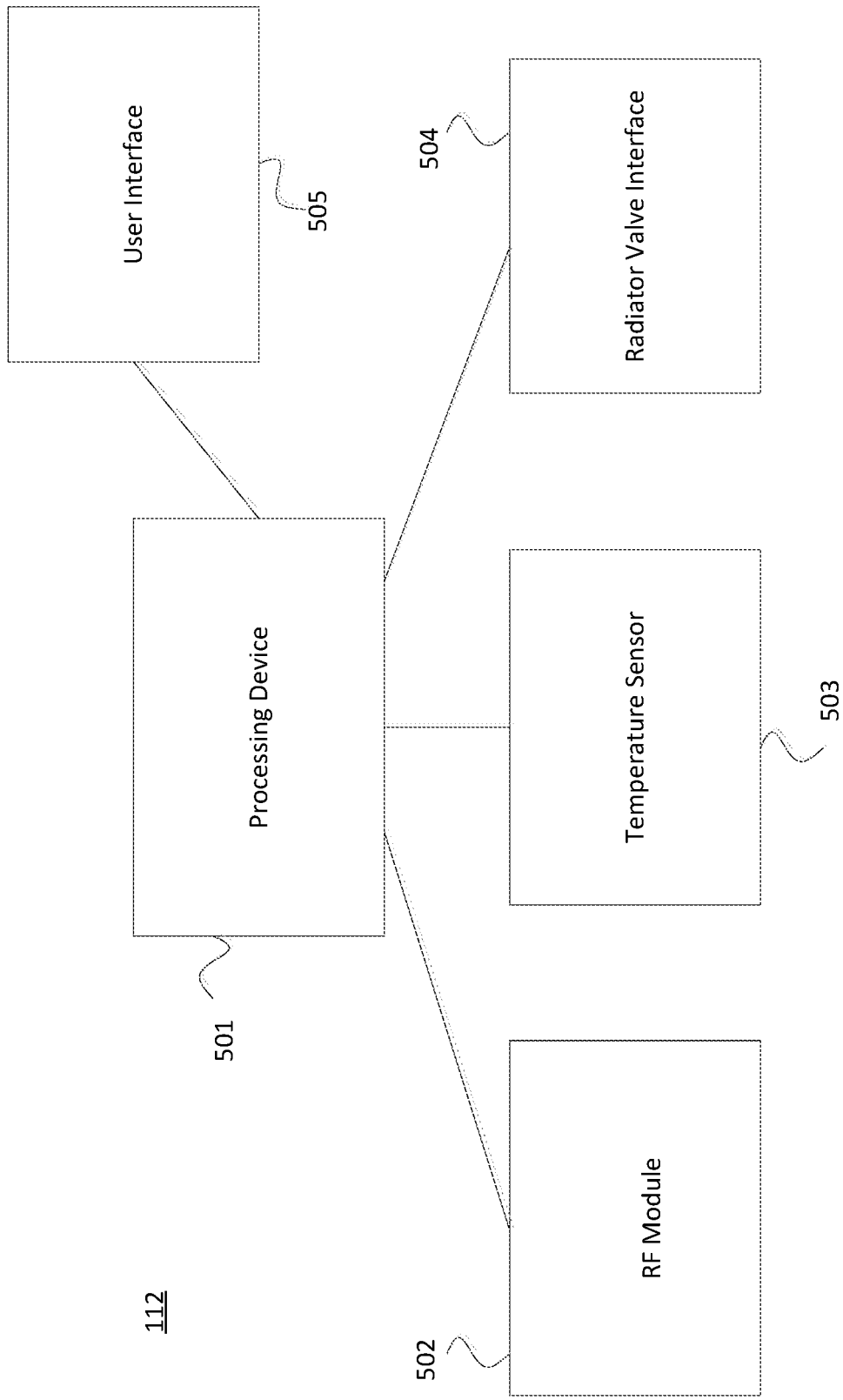
FIG. 5 shows a thermostatic radiator valve (TRV) controller in accordance with an embodiment of the invention.

FIG. 2 shows process 200 for controlling a heating system with single thermostat 112 and at least one thermostatic radiator valve (TRV) controller 109-111 in accordance with an embodiment of the invention. With some embodiments, process 200 may be performed by each TRV controller 109-111, where processing device 501, as shown in FIG. 5, executes process 200.

TRV controller 109-111 starts process 212 (e.g., electrical power is applied after installation) at block 201 and initializes at block 202.

At block 203, TRV controller 109-111 determines if it is calibrated. For example, as will be discussed, calibration includes the determination of the minimum opening and maximum opening position for associated valve 106-108. If not calibrated, TRV controller executes blocks 204-211 as will be discussed.

At block 204, process 200 determines whether the winter flag is set denoting winter mode. While winter mode is typically activated during the winter season, winter mode may be activated during the summer so that TRV controller 109-111 can be calibrated at a desired time. If the winter flag is not set, process 200 continues to block 205. Otherwise, process 200 continues to block 208.

At block 205, process determines whether there is a call for heat from the single thermostat 112. If not, process 200 returns to block 203. Otherwise, process 200 continues to block 206.

At block 206, TRV controller 109-111 determines whether the temperature has increased by comparing the room temperature as provided by single thermostat 112 from the temperature sensor 403 and the measured temperature from temperature sensor 503 as shown in FIG. 5. If so, process 200 sets the winter flag at block 207 and continues to block 208; otherwise, process 200 returns to block 203.

At block 208, process 200 determines whether there is a call for heat. If so, process 200 automatically detects the maximum power point (maximum opening position) at block 211 by associated valve 106-108. With some embodiments, TRV controller 109-111 detects the maximum power output point by checking the rate of temperature rising of the radiator as measured by temperature sensor 503 as shown in FIG. 5. By acquiring the maximum power pin position, TRV controller 109-111 registers the point as the 100 percentage opening for all future calculation rather than using the fully pin open position.

At block 208, if process 200 determines that there is no call for heat, TRV controller 109-111 determines if the sensor temperature is near room temperature, which is indicative that the pin position is approximately at the opening/closing point of valve 106-108. All further expecting pin position will refer to this open/closing point as the start point of calculation.

If during summer operation automatic detection fails, the process 200 automatically detects winter operation by checking a signature indicative of a call for heat in order to initiate the auto detection again. For example, if there is no call for heat for x days, the winter flag is cleared at block 213 and blocks 204-211 are repeated.

The automatic detection of the open/closing point (minimum pin position) and the maximum power point (maximum opening position) is executed at blocks 210 and 211, respectively, soon after installation, or through a RF command, or through a keypad in which a sequence of keys representing a corresponding command is entered through user interface 505 as shown in FIG. 5.

Figure 3:
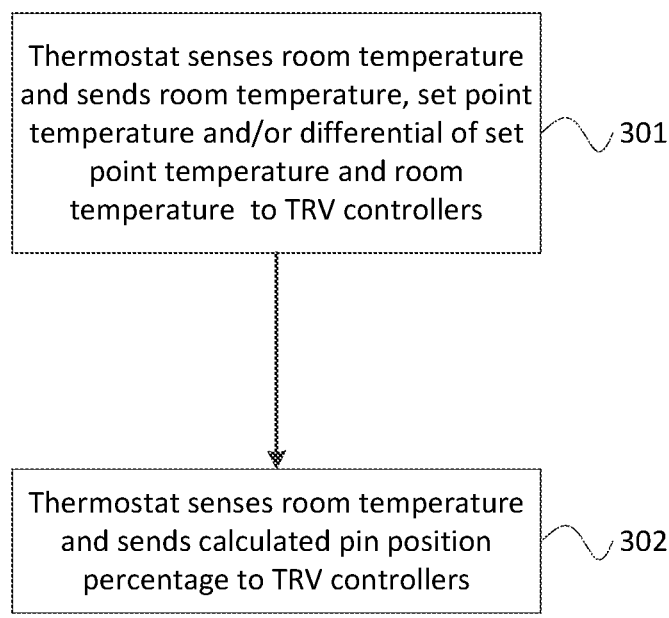
FIG. 3 shows a flowchart during normal operation in accordance with an embodiment of the invention.

FIG. 3 shows process 212 performed during normal operation in accordance with an embodiment. Step 301 may be performed with or without step 302 and step 302 may be performed with or without step 301.

At block 301, single thermostat 112 senses the room temperature and sends room temperature, set point temperature and/or differential of set point temperature and room temperature to TRV controllers 109-111. From this data the TRV controllers 109-11 can decide to open or close the valve 106-108.

At block 302, single thermostat 112 senses the room temperature and sends a calculated pin position percentage to TRV controller 109, where 0 percentage corresponds to the open/closed position and 100 percentage corresponds to the maximum opening position. From this data the TRV controllers 109-111 can move the valve to the correct position.

Figure 4:
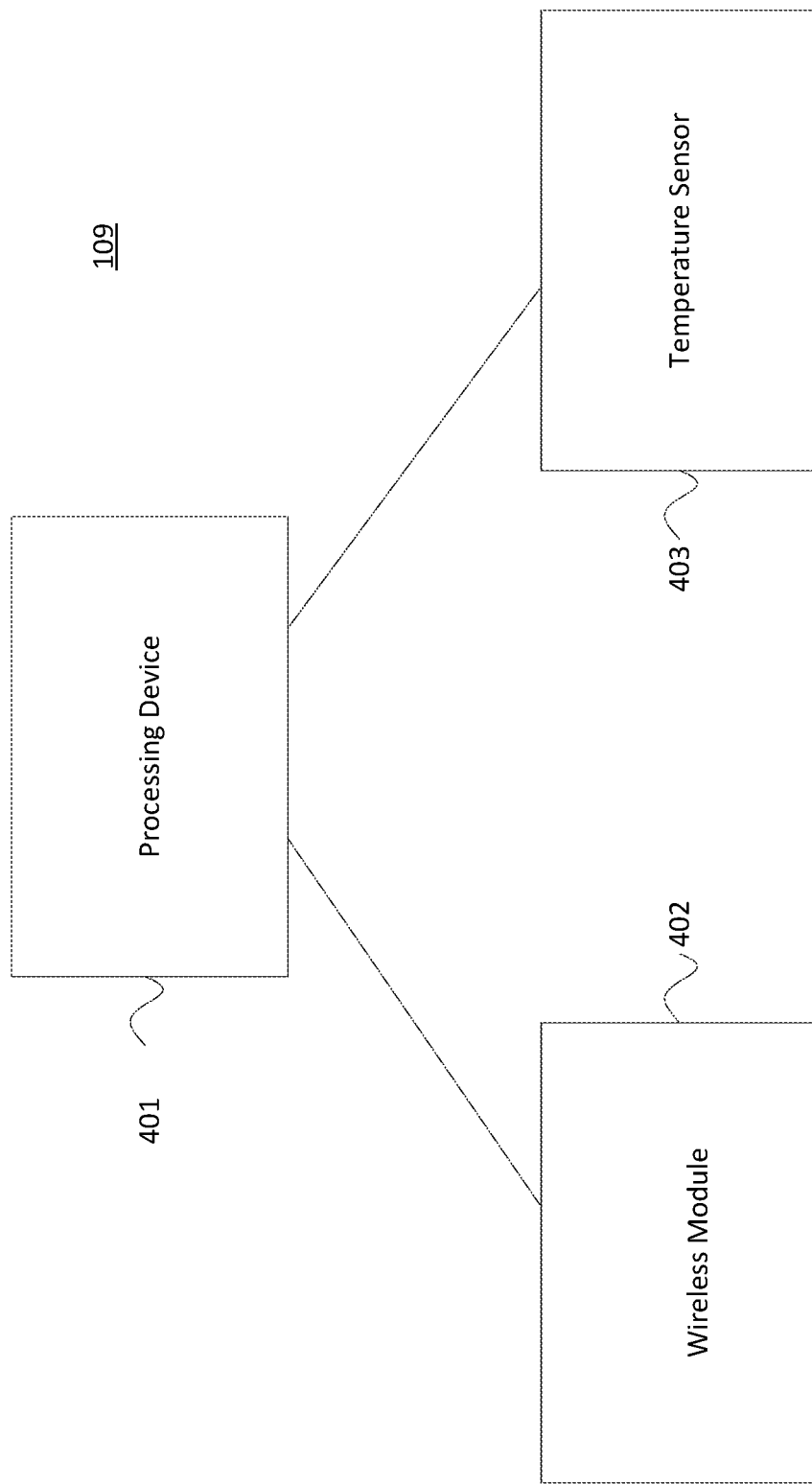
FIG. 4 shows a thermostat in accordance with an embodiment of the invention.

FIG. 4 shows single thermostat 112 in accordance with an embodiment of the invention. Single thermostat 112 comprises processing device 401, wireless module 402 or integrated circuitry, and temperature sensor 403. Processing device 401 may assume different forms such as a microcontroller (or MCU, short for microcontroller unit) that may comprise a small computer (SoC) on a single integrated circuit containing a processor core, memory, and programmable input/output peripherals.

Single thermostat 112 may communicate with TRV controllers 109-111 via wireless module 402 via a wireless channel in order to convey information (e.g., a pin position percentage). However, with some embodiments, thermostat 112 and TRV controller 109-111 may communication via a wired configuration.

The heating system may comprise single thermostat 112 with a microcontroller, radio frequency (RF) module or integrated RF circuitry, and temperature sensor to sense the room temperature.

Thermostat 112 senses the room temperature utilizing temperature sensor 403 and sends the room temperature, the pin position percentage, set point temperature and/or differential of set point temperature and room temperature to TRV controllers 109-111.

FIG. 5 shows thermostatic radiator valve (TRV) controller 109 in accordance with an embodiment of the invention. TRV controller comprises processing device 501, wireless module 502 or integrated circuitry, temperature sensor 503, radiator valve interface 504, and user interface 505.

TRV controller 109 may execute in a standalone-mode by measuring the surrounding temperature close to the radiator through temperature sensor 503 and may regulate the temperature by adjusting the valve opening through valve interface 504.

With some embodiments, valve interface 504 comprises a servo motor that moves the valve pin to a desired position and circuitry to control the servo motor. The servo motor enables TRV controller 109 to control the linear position of the pin within a desired amount of preciseness.

Because temperature sensor 503 is typically close to associated radiator 102-104 (as shown in FIG. 1), the measured temperature is typically hotter than the actual room temperature when the valve 106-108 is open. By communicating with thermostat 112 through wireless module 502, TRV controller 109 can regulate the room temperature based on the temperature measured with thermostat 112 mounted, for example, on a wall or table within the room. The TRV controller 109 now has the room temperature reading from thermostat 112 and can therefore adjust the radiator valve 108 correctly.

The automatic detection of the open/closing point (minimum pin position) and the maximum power point (maximum opening position) as executed at blocks 210 and 211 shown in FIG. 2, respectively, may be initiated soon after installation, through a command from wireless module 502, or through a keypad in which is sequence of keys are pressed that is indicative of a command via user interface 505. While the keypad may be directly associated with TRV controller 109-111, some embodiments may support a keypad at thermostat 112. In such a case, the entered command may be sent over wireless module 402 to TRV controller 109-111.

With reference to FIGS. 4 and 5, the computing system environment may include a computing device wherein the processes (e.g., shown in FIGS. 2 and 3) discussed herein may be implemented. The computing device may have a processor for controlling overall operation of the computing device and its associated components, including RAM, ROM, communications module, and memory device. The computing device typically includes a variety of computer readable media. Computer readable media may be any available media that may be accessed by the computing device and include both volatile and nonvolatile media, removable and non-removable media. By way of example, and not limitation, computer readable media may comprise a combination of computer storage media and communication media.

Computer storage media may include volatile and non-volatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the computing device.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A heating system comprising:
    a single thermostat;
    a first radiator configured to transfer heat to a surrounding room and comprising a first valve;
    a first thermostatic radiator valve (TRV) controller configured to control the first valve of the first radiator;
    the first valve comprising a first pin, wherein a first operating position of the first pin determines a first amount of heat transferred to the first radiator;
    the first TRV controller configured to automatically determine a first minimum opening position and a first maximum opening position of the first pin;
    the single thermostat configured to determine the first operating position of the first pin from a room temperature and a set point temperature of the surrounding room and to send first position information indicative of the first operating position to the first TRV controller; and
    the first TRV controller configured to adjust the first operating position between the first minimum opening position and the first maximum opening position from the first position information, wherein the first TRV controller automatically detects winter operation when an auto-detection fails, detects a signature indicative of a call for heat, and initiates a subsequent auto-detection.

2. The heating system of claim 1, further comprising:
    a plurality of TRV controllers comprising the first TRV controller and a second TRV controller;
    a second radiator configured to transfer heat to the surrounding room and comprising a second valve;
    the second TRV controller configured to control the second valve of the second radiator;

the second valve comprising a second pin, wherein a second operating position of the second pin determines a second amount of heat transferred to the second radiator;

the second TRV controller configured to automatically determine a second minimum opening position and a second maximum opening position of the second pin;

the single thermostat configured to determine the second operating position of the second pin from the room temperature and the set point temperature of the surrounding room and to send second position information indicative of the second operating position to the second TRV controller; and the second TRV controller configured to adjust the second operating position between the second minimum opening position and the second maximum opening position from the second position information.

3. The heating system of claim 2, wherein the first and second minimum opening positions are different.

4. The heating system of claim 2, wherein first and second maximum opening positions of the first and second valves, respectively are different.

5. The heating system of claim 1, wherein the single thermostat comprises:
a computing device;
a wireless module; and
a temperature sensor configured to measure the room temperature.

6. The heating system of claim 1, wherein the first TRV controller is configured to automatically determine the first minimum opening position by:
sensing a temperature turning point; and
in response to the sensing, registering the first minimum opening position of the first pin.

7. The heating system of claim 1, wherein the first TRV controller is configured to automatically determine the first minimum opening position when the TRV controller is installed.

8. The heating system of claim 1, wherein the first TRV controller is configured to automatically determine the first minimum opening position when the TRV controller determines when a predetermined command sequence is entered.

9. The heating system of claim 1, wherein the first TRV controller is configured to automatically determine the first maximum opening position by:
sensing when the first radiator is transferring a maximum amount of heat; and
in response to the sensing, registering a first pin position when the maximum amount of heat is transferred; and
equating the first maximum opening position to the first pin position.

10. The heating system of claim 1, wherein:
the single thermostat comprises a thermostat wireless module and the first TRV controller comprises a first TRV wireless module;
the single thermostat transmits the first position information through the thermostat wireless module; and
the first TRV controller receives the first position information through the first TRV wireless module.

11. A thermostatic radiator valve (TRV) controller comprising:
a wireless module;
a temperature sensor configured to measure a radiator temperature at a predetermined distance from a radiator; and a computing device configured to perform:
determining a minimum opening position of a pin of a valve of the radiator;
determining a maximum opening position of the pin;
receiving position information for an operating position of the pin through the wireless module via a wireless channel;
adjusting the operating position of the pin between the minimum opening position and the maximum opening position from the position information;
when an auto-detection fails, detecting a signature indicative of a call for heat; and
initiating a subsequent auto-detection.

12. The thermostatic radiator valve (TRV) controller of claim 11, wherein the determining the minimum opening position of the pin comprises:
sensing a temperature turning point; and
in response to the sensing, registering the minimum opening position of the pin.

13. The thermostatic radiator valve (TRV) controller of claim 11, wherein the determining the maximum opening position of the pin comprises:
sensing when the radiator is transferring a maximum amount of heat; and
in response to the sensing, registering a first pin position when the maximum amount of heat is transferred; and
equating the maximum opening position to the first pin position.

14. A single thermostat in a heating system for a surrounding room with a plurality of thermostatic radiator valve (TRV) controllers, the single thermostat comprising:
a computing device;
a wireless module; and
the computing device configured to perform:
sensing a room temperature of the surrounding room;
determining a first operating position of a first pin of a first thermostatic valve from the room temperature and a set point temperature of the surrounding room;
determining a second operating position of a second pin of a second thermostatic valve from the room temperature and the set point temperature of the surrounding room;
normalizing the first operating position to first characteristics of the first thermostatic valve and the second operating position to second characteristics of the second thermostatic valve, wherein
a first minimum opening position and a second minimum opening position of the first and second thermostatic valves, respectively, are different; and
a first maximum opening position and a second maximum opening position of the first and second thermostatic valves, respectively, are different; and
sending first and second normalized position information to first and second TRV controllers, respectively, through the wireless module.

15. The single thermostat of claim 14, wherein the computing device is configured to perform:
sending the room temperature and the set point temperature to the first and second TRV controllers.

16. The single thermostat of claim 14, wherein the computing device is configured to perform:
sending a differential room temperature and a differential set point temperature to the first and second TRV controllers.

17. The single thermostat of claim 14, wherein:
the first operating position is indicative of a determined percentage between the first minimum opening position and the first maximum opening position; and
the second operating position is indicative of the determined percentage between the second minimum opening position and the second maximum opening position.

* * * * *